(12) United States Patent
Zerber

(10) Patent No.: US 6,292,770 B1
(45) Date of Patent: Sep. 18, 2001

(54) JAPANESE LANGUAGE USER INTERFACE FOR MESSAGING SYSTEM

(75) Inventor: Kevin Zerber, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/786,318

(22) Filed: Jan. 22, 1997

(51) Int. Cl.$^7$ ........................................... G06F 17/28

(52) U.S. Cl. ................................. 704/8; 707/535

(58) Field of Search ..................... 704/1, 8, 9; 707/3, 707/531, 535, 513

(56) References Cited

U.S. PATENT DOCUMENTS

| | | |
|---|---|---|
| 4,737,040 | 4/1988 | Moon . |
| 4,761,761 | 8/1988 | Sekiguchi . |
| 4,845,612 | 7/1989 | Sakai et al. . |
| 4,873,625 | 10/1989 | Archer et al. . |
| 5,109,352 | 4/1992 | O'Dell . |
| 5,136,504 | 8/1992 | Fushimoto . |
| 5,255,189 | 10/1993 | Woo . |
| 5,337,233 * | 8/1994 | Hobert et al. .............................. 704/1 |
| 5,341,316 | 8/1994 | Nishigaki . |
| 5,387,042 | 2/1995 | Brown . |
| 5,745,891 * | 4/1998 | Minakuchi et al. ...................... 707/3 |

FOREIGN PATENT DOCUMENTS

| | | |
|---|---|---|
| 0 314 503 | 5/1989 | (EP) . |
| 7200256 | 4/1995 | (JP) . |
| 8095970 | 12/1996 | (JP) . |
| 8095971 | 12/1996 | (JP) . |
| 223689 | 11/1994 | (TW) . |
| 259854 | 11/1995 | (TW) . |

OTHER PUBLICATIONS

Designate–Character–Set (3G); Hewlett–Packard, Designate–Character–Set (3G) Starbase Reference (Palo Alto Ca: Hewlett–Packard, 1992); Aug., 1992; excerpts as retrieved from Software Patent Institute database available at www.s-pi.org.

Japanese Handprint Segmentation; IBM TDB v39 n3 03–96 p.263–276; Mar. 1996; excerpts as retrieved from Software Patent Institute database available at www.spi.org.

Structure of Kana Address Dictionary; IBM TDB n4a 09–92 p82–83; Sep., 1992; excerpts as retrieved from Software Patent Institute database available at www.spi.org.

(List continued on next page.)

Primary Examiner—Ping Lee
Assistant Examiner—Patrick N. Edouard
(74) Attorney, Agent, or Firm—Brown Raysman Millstein Felder & Steiner LLP

(57) ABSTRACT

A method and program for providing a Japanese language user interface for a messaging system which transfers messages among users on the system based upon addresses represented in an address format such as ASCII. The method includes the steps of storing a plurality of addresses in an address directory, each address being represented in kana, kanji, and address format; and sorting the address directory in a first order based upon the kana form of the addresses and in a second order based upon the address format of the addresses. Sorting can be accomplished by indexing the directory and sorting the index. When creating a new message, a user of the application program selects a given address from the address directory by inputting the given address in kana form. The directory is searched for the input address in kana form and, when found, the address format of the address is retrieved. The new message is then transferred using the address format. When a message is received by the user, the kanji form of the address of the sender of the message is retrieved from the directory and displayed along with the address format.

7 Claims, 10 Drawing Sheets

OTHER PUBLICATIONS

Multi–font Recognition Method Using a Layered Template Dictionary; IBM TDB n9 02–92 p256–260; Feb., 1992; excerpts as retrieved from Software Patent Institute database available at www.spi.org.

Using Multiple Character Sets; Hewlett–Packard, Using Multiple Character Sets from Chapter 9 Using HP–PHIGS Text, HP–PHIGS Graphics Techniques (Palo Alto Ca: Hewlett–Packard, 1991); Nov., 1991; excerpts as retrieved from Software Patent Institute database available at www.spi.org.

Multi–Byte Fonts; Hewlett–Packard, Multi–Byte Fonts from Chapter 6 Using Starbase Text, Starbase Graphics Techniques (Palo Alto Ca: Hewlett–Packard, 1991); Nov., 1991; excerpts as retrieved from Software Patent Institute database available at www.spi.org.

File Positioning; Hewlett–Packard, File Positioning from Chapter 16 File System Interface, HP Prolog II Reference Manual (Palo Alto Ca: Hewlett–Packard, 1989); Dec., 1989; excerpts as retrieved from Software Patent Institute database available at www.spi.org.

Candidate Reduction Method for Character Recognition; IBM TDB 09–89 p.412–413; Sep., 1989; excerpts as retrieved from Software Patent Institute database available at www.spi.org.

Tablet Image Filtering for Recognition Purposes; IBM TDB 08–85 p.1158–1161; Aug., 1985; excerpts as retrieved from Software Patent Institute database available at www.spi.org.

Chinese Text Processing System; IBM TDB 01–76 p.2691–2692; Jan., 1976; excerpts as retrieved from Software Patent Institute database available at www.spi.org.

* cited by examiner

FIG. 8

JAPANESE LANGUAGE USER INTERFACE FOR MESSAGING SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to data management and user interface systems. More particularly, the present invention relates to a method for managing a list of data items such as addresses and a user interface for providing access to and use of the data items in languages such as Japanese which use phonetic and symbolic characters.

Data can be sorted in many ways. In many computer systems, data is sorted using the ASCII character set. Each character in the ASCII set is assigned a numerical value and data represented in ASCII format is sorted using these number values. The English alphabet is arranged in the ASCII character set in proper order, so that sorting a list of data according to ASCII is generally consistent with sorting the data alphabetically.

However, the order in which data is sorted in other languages is not always consistent with the order in which data sets such as ASCII are sorted. Moreover, some Asian languages, Japanese in particular, do not have an alphabet per se but rather employ symbolic characters and phonetic characters. In Japanese, concepts are represented by the ideographic or symbolic characters called kanji, while sounds are represented by one of two phonetic character sets, hirigana and katakana, collectively referred to as kana. Although Japanese people visualize and read in kanji, kanji symbols do not have any inherent sequence which would make them suitable for sorting. The phonetic character sets, on the other hand, are organized in a sequence, for example, according to the gojuuonzu (or "table of fifty sounds"). The phonetic characters can also be represented in English characters, a representation called romaji.

Japanese people prefer to read kanji characters but prefer to see data ordered according to kana. However, computer character sets such as ASCII or Unicode (a standard, two byte, multilingual character set which is a superset of ASCII) can not provide the functionality needed to sort data according to a scheme different than how the data is displayed, and thus existing computer systems do not, to the inventor's knowledge, meet the needs of the Japanese market.

The sorting problem described above becomes particularly important in the context of application programs which use data represented in one particular format. For example, a messaging system which transfers messages among users or among post offices determines where to send messages based on addresses represented in ASCII according to a predefined format such as the standard Internet e-mail format. Also, web sites available over the World Wide Web are identified by Uniform or Universal Resource Locators or URLs represented in ASCII characters according to a predefined format, and browser programs search for and locate particular sites and particular documents stored on the sites using these URLs. As yet a further example, operating systems represent filenames or directory names in ASCII according to particular formats.

In programs of these types, Japanese users are forced to learn and employ the data format required for the particular program, even though the format is in ASCII with which they are not naturally familiar. Also, Japanese users must become accustomed to searching for particular data from a list of such data which is displayed in ASCII format and sorted according to ASCII, even though they are naturally familiar with entirely different display and ordering arrangements in their non-computerized applications.

There is thus a need for a program which presents data to Japanese users in the familiar kanji form sorted according to the familiar kana form, and which provides a user interface for Japanese users which allows them to work with data in kanji and kana but which functions with the data in the format required by the program.

BRIEF SUMMARY OF THE INVENTION

It is an object of the present invention to solve the problems described above with existing computer programs.

It is another object of the present invention to provide a user interface for Japanese users which allows them to work with data in kana and kanji forms.

It is another object of the present invention to provide such a user interface in a messaging system which uses addresses in ASCII but which allows Japanese users to view and work with addresses in kanji and kana form.

The above and other objects are achieved by a method for providing an application program user interface for a language having symbolic and phonetic characters, the application program using data represented in a program format different than the symbolic and phonetic characters. The method comprises storing a plurality of data items in a list, each data item being represented in phonetic, symbolic and program format. The data items are usable by the application program to identify a particular user, file or object accessible to or addressable by the application program. In some embodiments, the data items are addresses used by a messaging system such as an electronic mail system.

The method further involves sorting the list in a first order based upon the phonetic form of the data items, allowing a user of the application program to select a given data item from the list by inputting the given data item in phonetic form, locating the input given data item from the list using the first order, and retrieving the program format of the given data item for use by the application program. The program format of the given data item can then be used by the application program to identify the user, file or object identified by the given data item. For example, an address can be used to send a message over a network to a specific user identified by the address. A URL can be used to locate and retrieve a specific document available over the World Wide Web.

In further embodiments of the invention, the symbolic form of the given data item input in phonetic form is displayed to the user. For example, for e-mail addresses, the user inputs the address in phonetic form in one field on a screen display, the program locates the address in the address directory using the first order, and the symbolic form is retrieved and displayed in a second field in the screen.

In some embodiments, the method further involves sorting the list in a second order based upon the program format of the data items. When the application program is to display a given data item to the user other than as a result of selection of the data item by the user, e.g., when a message is received by the user, the program locates the given data item from the list using the second order, retrieves the symbolic form of the given data item from the list, and displays the given data item to the user at least in symbolic form. The given data item can be displayed to the user in both symbolic form and program format.

BRIEF DESCRIPTION OF THE DRAWINGS

The invention is illustrated in the figures of the accompanying drawings which are meant to be exemplary and not limiting, in which like references refer to like or corresponding parts, and in which:

FIG. 8 is a screen displayed by a Japanese language program of one embodiment of the invention showing an inbox with addresses displayed in ASCII and kanji form.

DETAILED DESCRIPTION OF THE PREFERRED EMBODIMENTS

Figure 1:
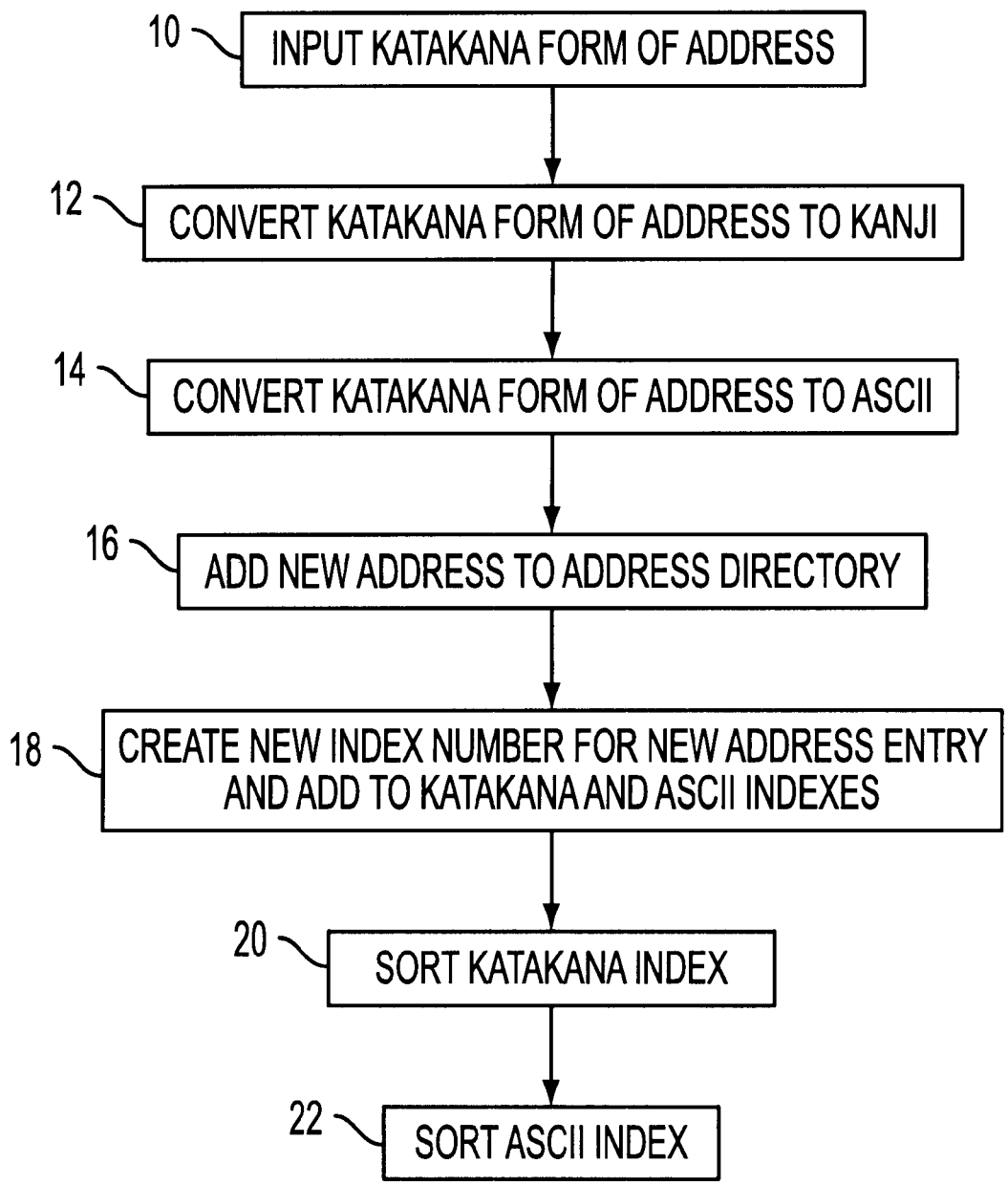
FIG. 1 is a flow chart showing a method of adding a new address to a Japanese language address directory in one embodiment of the invention.

The invention is described with reference to the flow charts and screen displays shown in FIGS. 1–9. One embodiment of the invention is described herein as implemented in the Lotus cc:Mail® messaging system available from Lotus Development Corporation of Cambridge, Mass., the assignee of the present application. Lotus cc:Mail® is a LAN-based messaging system which provides cross-platform e-mail functionality, integrated electronic forms, and calendering and scheduling capabilities. The version illustrated herein is compatible with the Windows® operating system available from Microsoft Corporation. The operation and use of Lotus cc:Mail® and other messaging systems are known to those of skill in the art and will be described only briefly below for background purposes. One skilled in the art will recognize that the invention may be used and implemented with many other types of software programs, including file management programs, operating systems, database programs, and web browsers.

A Lotus cc:Mail® system includes one or more post offices, user mailboxes, and message routers. Post offices are sets of database files located on a network file server. Post offices are the central repository for cc:Mail messages and addresses, and contain the individual mailboxes for local and remote users and other post offices. Each post office also contains a mail or address directory that lists the addresses of users available to send or receive mail messages over the network. Each cc:Mail user has access to a mailbox which contains the user's messages organized into one or more containers including an inbox where new messages arrive, folders created by the user, and others. A router is a message transfer agent which moves messages from one point to another on the network.

Lotus cc:Mail employs a method called location independent addressing to address messages. When creating a new message, a user can select another user's address from the address directory stored at the cc:Mail post office. As a result, a user need not input a destination address each time a new message is created. Administrators maintain the address directory by adding users to and deleting users from the directory.

In order to provide a Japanese language user interface for Lotus cc:Mail®, a commercially available software program called an input method editor or system ("IME") is used to allow for input of Japanese kana characters using a standard English language keyboard, conversion of the kana characters to other forms including kanji and romaji (ASCII), and the output of Japanese characters including kana and kanji. Examples of IMEs are WNN, which is widely available, and Canna. The operation and use of IMEs are known to those of skill in the art and need not be described further herein.

In accordance with the invention, addresses in the address directory are stored in ASCII format as used by Lotus cc:Mail® to route messages as well as in kanji and katakana form stored in Unicode for use by Japanese users. The three forms of the address are stored in three separate fields in the directory, and additional fields may be stored in association with each address entry in the directory. The ASCII address fields are indexed using an ASCII key. The katakana address fields are indexed based upon a table of sorting codes arranged according to a desired sequence of katakana characters, e.g., according to the gojuuonzu or some other desired sequence. In one embodiment, the table of sorting codes comprises a list of Unicode values representing katakana characters arranged in the desired sequence. The ASCII index is sorted by ASCII value and the katakana index is sorted based upon the table of sorting codes. The sorted indexes are stored in the post office along with the address directory.

With reference to FIG. 1, a user can input a new address in kana form, such as in katakana form, using the IME, step 10. The IME converts the katakana form of the address to kanji, step 12. The katakana form is also converted to ASCII form, step 14, either by the IME or through a dictionary lookup. Alternatively, the ASCII form of the address can be input directly by the user. The new address is added to the address directory, step 16, wherein it is stored in all three forms—katakana, kanji, and ASCII—in three separate fields as explained above. In addition, a new index number is created for the new address entry, step 18, and added to both katakana and ASCII indexes. The katakana index is then sorted, step 20, according to the table of sorting codes, and the revised index saved in the post office. The ASCII index is sorted, step 22, according to ASCII values and the revised index also saved at the post office.

Figure 2:
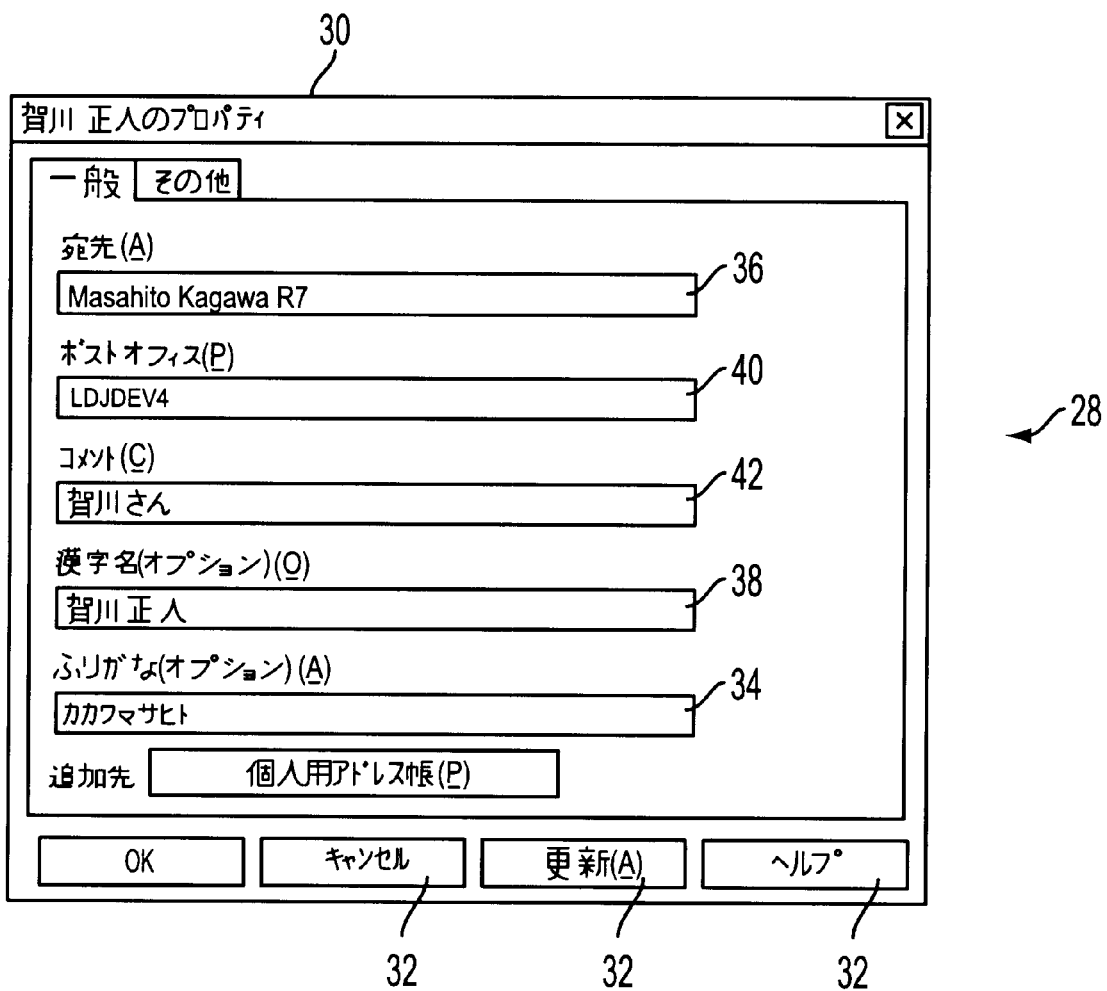
FIG. 2 is a screen displayed by a Japanese language program of one embodiment of the invention for inputting a new address.

FIG. 2 shows an address properties dialog box 28 used in one embodiment of the invention for inputting a new address or changing information relating to an existing address entry in the directory. Information on the screen is displayed in Japanese through kanji and/or kana. For example, the header 30 and command icons or buttons 32 contain address entry information or commands in Japanese. The dialog box 28 contains a number of data fields for the input and display of information relating to the address. One of the fields 34 provides for the input of the address in katakana, another field 36 provides for entry and display of the address data in ASCII, and a third field 38 displays the kanji form of the address. Those familiar with katakana and kanji will note that the data contained in fields 34, 36, and 38 in the sample dialog box 28 of FIG. 2 represent the same name. Field 40 contains data regarding the location of the user on the cc:Mail network, and field 42 provides for comments to be associated with the address. As mentioned above, the IME provides the capability for a user to enter address information in katakana and to convert this information to kanji and ASCII.

Figure 3:
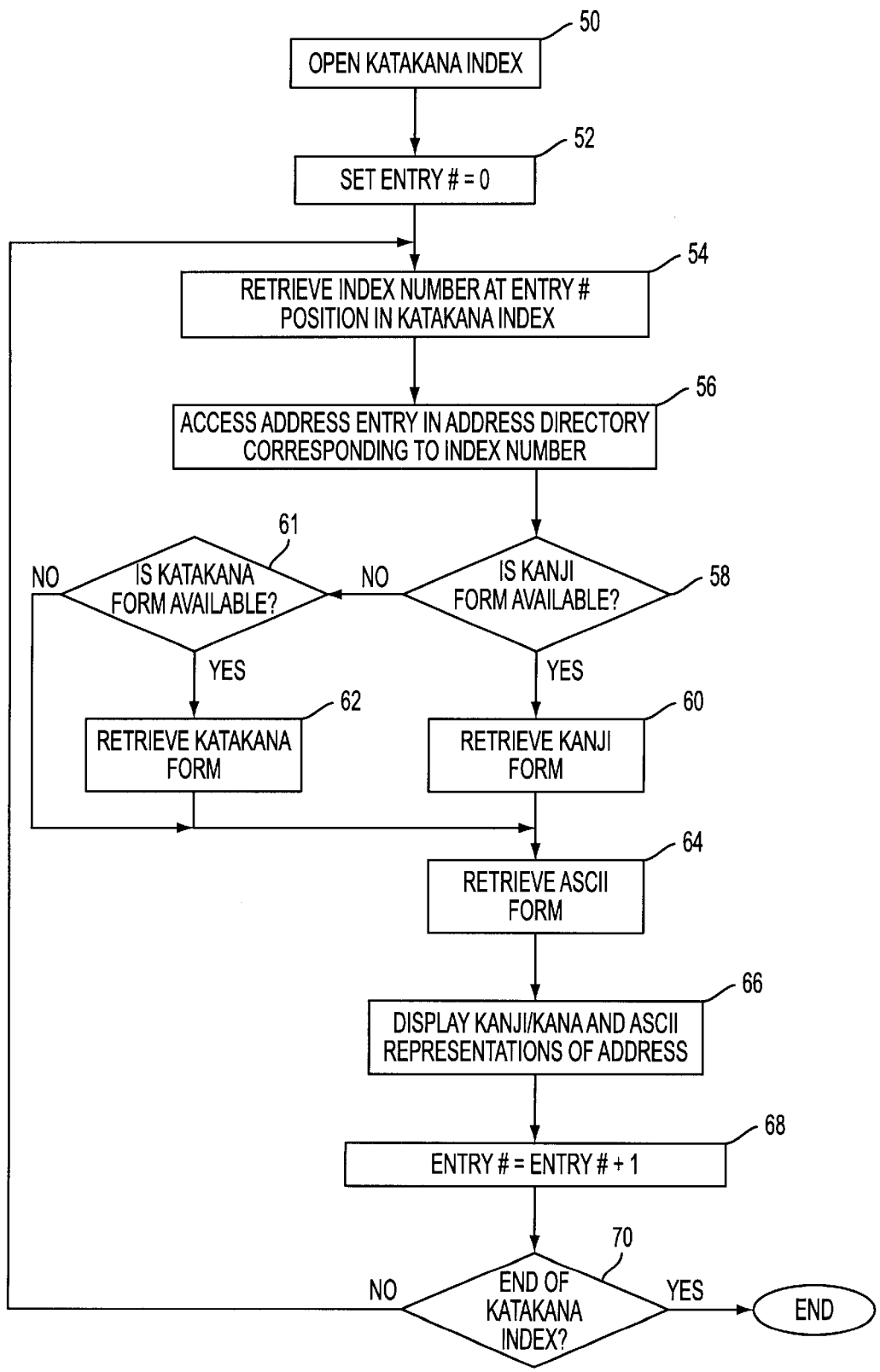
FIG. 3 is a flow chart showing a method of retrieving and displaying a Japanese language address directory according to one embodiment of the present invention.

Upon user request, the address directory can be displayed. With reference to FIG. 3, the katakana index is opened, step 50, and a variable entry# is set equal to 0, step 52. The index number in the katakana index whose position in the sorted katakana index corresponds to the entry# value (initially 0 i.e., the first index number in the katakana index) is retrieved, step 54. The address entry in the directory corresponding to the retrieved index number is then accessed, step 56, and the kanji field is accessed to determine whether the kanji form is available, step 58. If a kanji form is available, it is retrieved, step 60. Otherwise, the katakana field is accessed to determine whether the katakana form is available, step 61, and if so it is retrieved, step 62. The ASCII form of the address entry is also retrieved, step 64.

The kanji and katakana forms of the accessed address entry are displayed, step 66, or are stored in a display buffer to be displayed. The variable entry# is incremented by 1, step 68 and, unless the end of the katakana index has been reached, step 70, the next index number in the katakana index is retrieved, step 54. This process of using the katakana index to retrieve the address entries in the directory is repeated until all the entries are retrieved and displayed.

Figure 4:
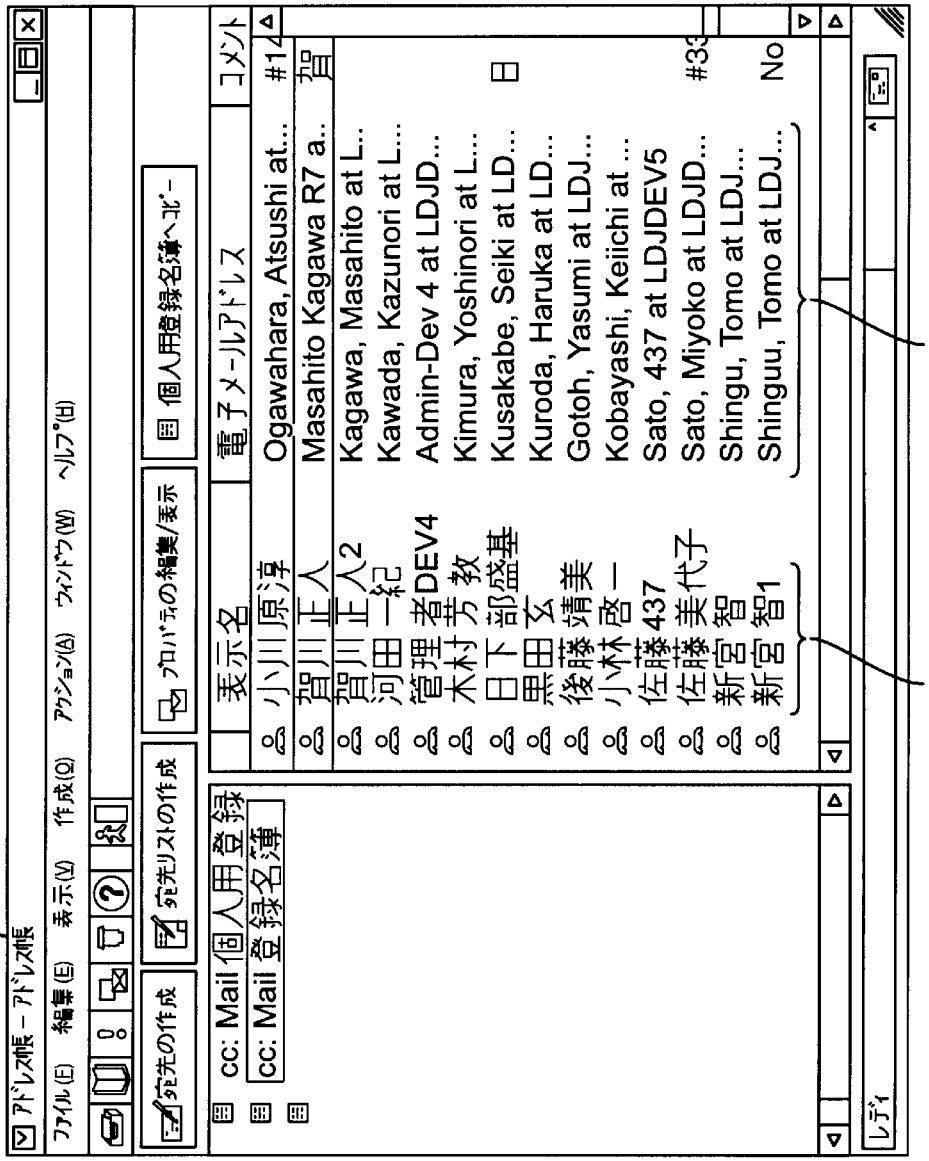
FIG. 4 is a screen displayed by a Japanese language program of one embodiment of the invention for displaying a Japanese address directory.
Figure 5A:
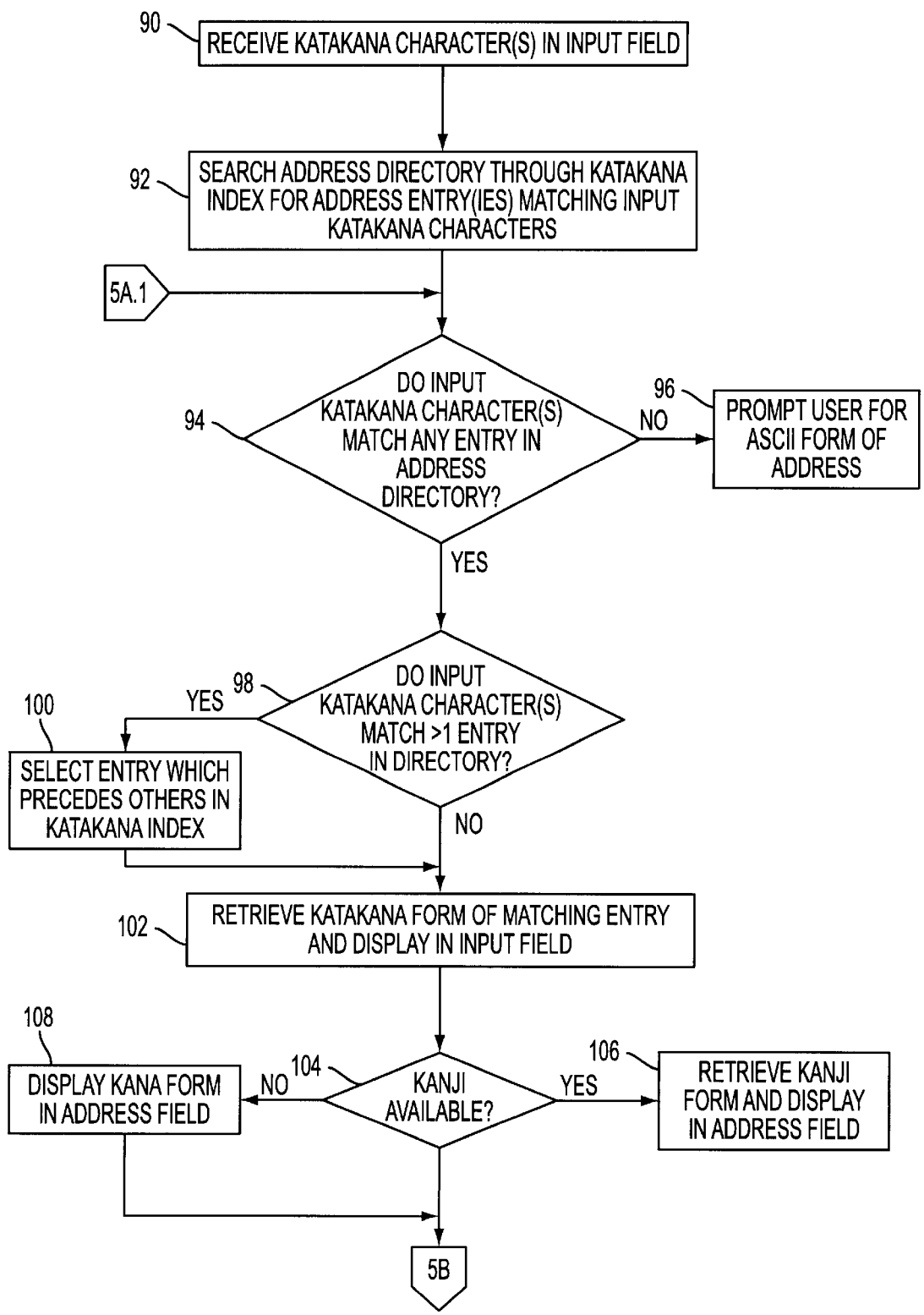
FIG. 5 is a flow chart showing a method of addressing a new message with a Japanese language address according to one embodiment of the present invention.
Figure 5B:
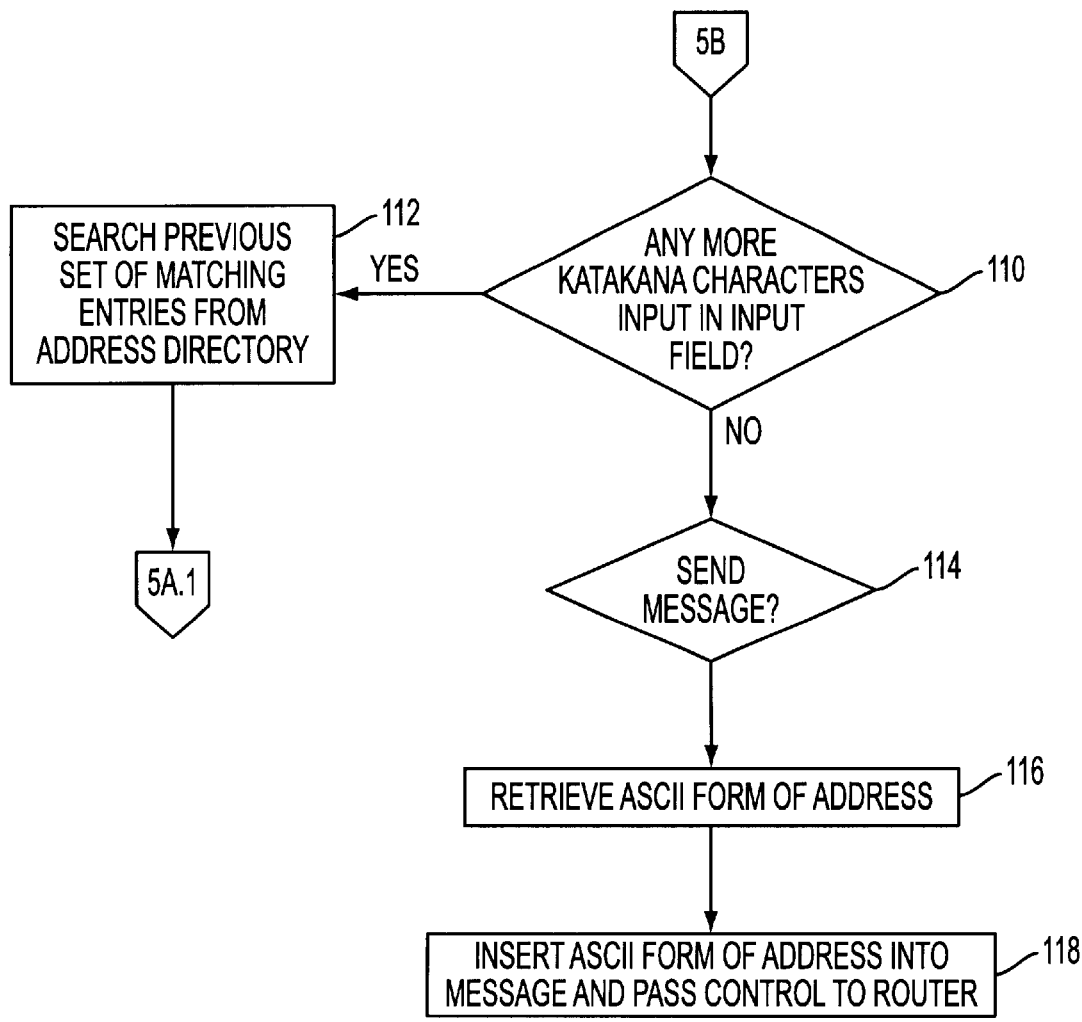

The resulting directory listing is shown in FIG. 4. The address directory listing dialog box 74 contains Japanese language header and menu information 76, a first column 78 containing the addresses in the directory displayed in kanji form, and a second column 80 displaying the addresses in ASCII form. In accordance with an advantageous feature of the invention, the addresses are displayed in kanji form but are sorted in katakana order, a scheme with which many Japanese are most familiar. Those familiar with katakana will understand that the ASCII forms of the addresses in column 80 are not in ASCII or English sequence, but that the sequence represents katakana order for the addresses (e.g., in katakana sequence the sound "o" at the start of "Ogawahara" precedes the "ka" sound at the start of "Kagawa", and the katakana symbol for the "go" sound as in "Gotoh" is actually the same as the "ko" sound with a nigori (two small lines) used to distinguish "go" from "ko").

Figure 6:
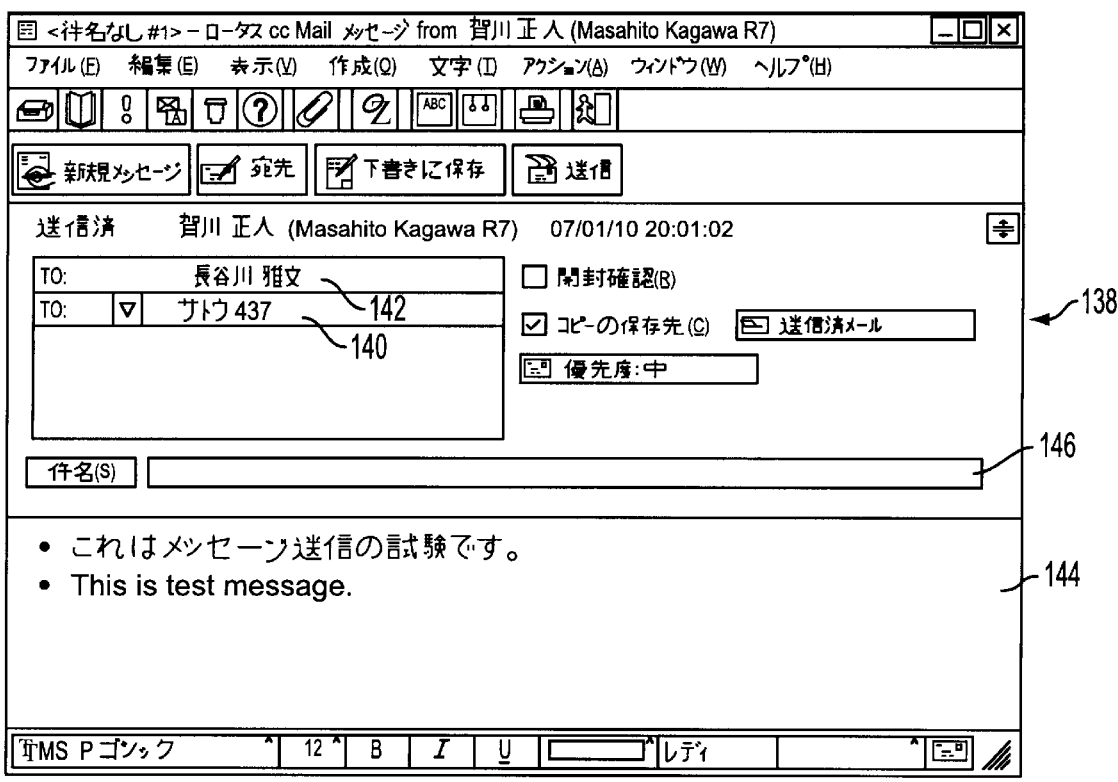
FIG. 6 is a screen displayed by a Japanese language program of one embodiment of the invention for creating and addressing a new message.

When a new message is addressed by a user, the user inputs the katakana form of the address, the cc:Mail system displays the kanji form of the address, and the router uses the ASCII form of the address. In preferred embodiments of the invention, type-down addressing capability is provided for the input. Referring to the flow chart in FIGS. 5A–5B and the new message dialog box 138 shown in FIG. 6, the user begins inputting katakana characters, step 90 in an input field 140 (FIG. 6). As each katakana character is input, the address directory is searched through the katakana index for one or more address entries having the input katakana character(s), step 92. If no address entry is found which matches the input katakana character(s), step 94, the user is prompted to input the ASCII form of the address, step 96, so that the message can be sent by the router. If more than one address entry is found in address directory which match the katakana characters, step 98, the matching entry ordered first in the katakana index is selected, step 100. The katakana form of the selected address entry is retrieved from the directory and displayed in the input field 140, step 102. According to conventional type-ahead addressing practice, the non-input portion of the address is displayed as highlighted text, as shown in FIG. 6.

If the kanji form of the address is available in the address directory, step 104, it is retrieved from the directory and displayed in the address field 142 in new message dialog box 138, step 106. If the kanji form is unavailable, the katakana form may be displayed in the address field 142, step 108.

As the user continues to input katakana characters in the input field 140, step 110, the set of address entries from the address directory which matched the previously inputted katakana characters is searched for one or more entries which match the inputted katakana characters, step 112, and the process returns to checking for matching address entries, step 94. The input process continues until the user selects an address from the directory or enters a new ASCII address for use by the message router.

Figure 9:
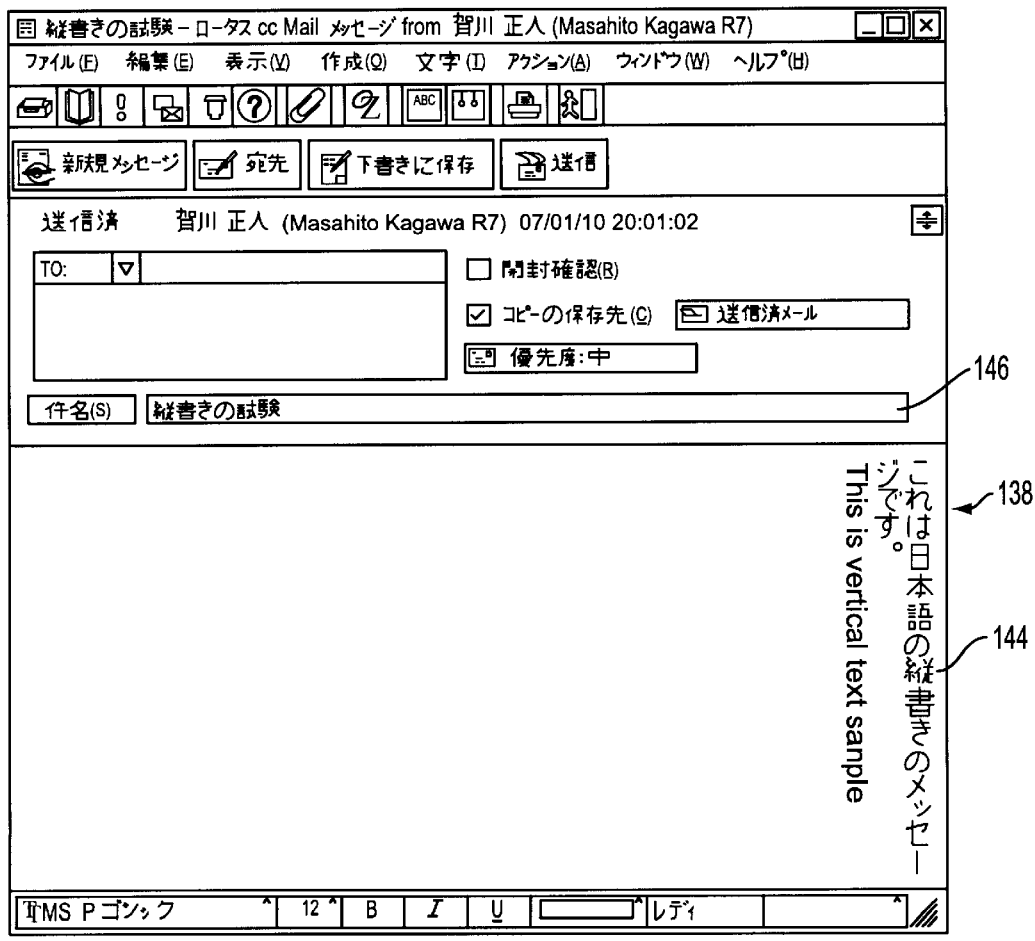
FIG. 9 is a screen displayed by a Japanese language program of one embodiment of the invention showing a message with vertical arrangement of text in the message.

Once the user selects an address, the message is completed by inputting ASCII and/or Japanese language text into the message space 144 of the new message dialog box 138 and by entering a subject matter description in the subject matter field 146. The IME facilitates the entry of non-ASCII text, as mentioned above. The text in the message space may be arranged horizontally as shown in FIG. 6 or vertically as shown in FIG. 9, at the user's option. When the user is finished preparing the message, the message is sent, step 114. The ASCII form of the address corresponding to the selected katakana address is retrieved from the directory, step 116, and inserted into the address field of the message in place of the katakana or kanji forms, step 118. Thus, the router can transfer the message through the use of the ASCII form of the address.

Figure 7:
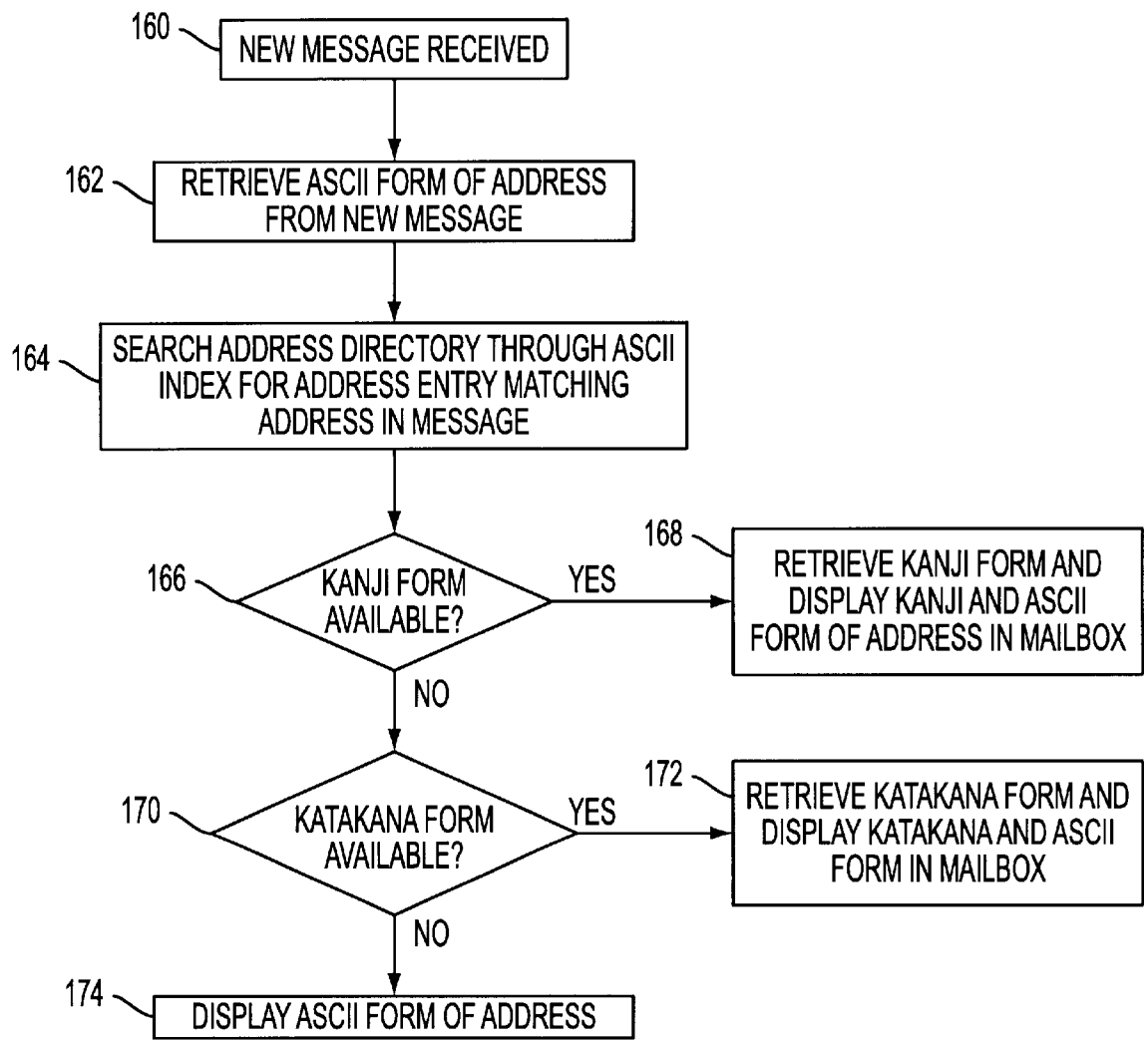
FIG. 7 is a flow chart showing a method of displaying the kanji form of an address when a message is delivered in accordance with one embodiment of the invention.
Figure 8:
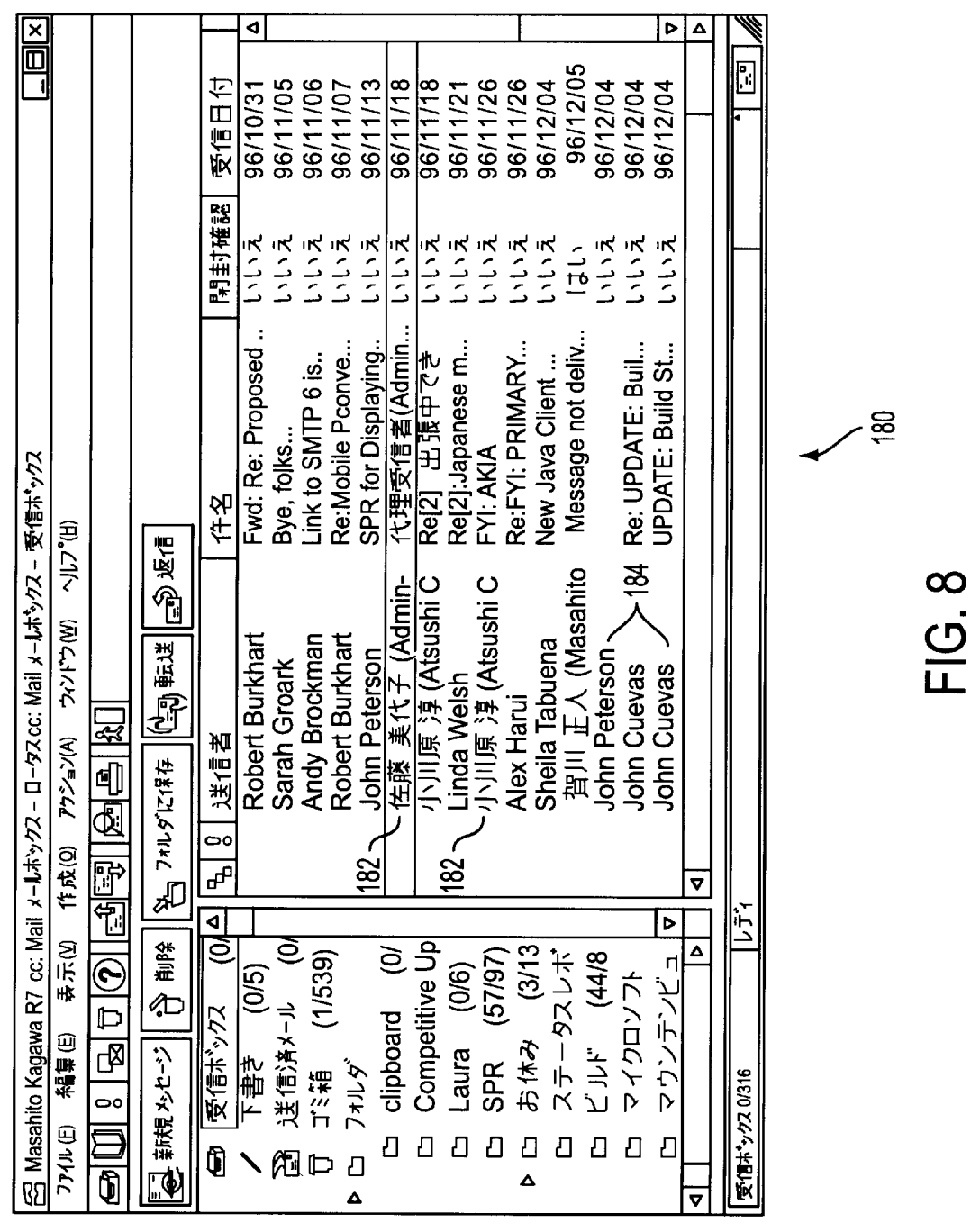

Referring now to FIGS. 7 and 8, when a new message is received by or to be delivered to a user, step 160, the ASCII form of the address is retrieved from the message, step 162, and the address directory is searched through the ASCII index for the address entry matching the address in the message, step 164. If a Kanji form of the address entry is available in the directory, step 166, that form is retrieved and displayed in the address field 182 of a mailbox dialog 180 (FIG. 8), step 168. The ASCII form may also be displayed to the extent sufficient space is available in the address field 182. If the Kanji form is unavailable but the katakana form is available, step 170, the katakana form is retrieved and displayed, step 172, along with all or part of the ASCII form. If neither Kanji nor katakana is available, only the ASCII form is displayed, step 174, as shown in address fields 184 in dialog box 180.

As a result, a Japanese user is shown the address of the sender of the message in Kanji form, as most Japanese would prefer to see it.

Although the invention was described herein in detail with respect to an address directory listing for a messaging system, it is also applicable to other types of systems in which character lists are maintained for selection, display, and use by an application program. Similarly, while the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for providing an application program user interface for a language having symbolic and phonetic characters, the application program using data represented in a program format different than the symbolic and phonetic characters, the method comprising:

storing a plurality of data items in a list, each data item being represented in phonetic, symbolic and program format, the data items being usable by the application program to identify a particular user, file or object accessible to or addressable by the application program;

sorting the list in a first order based upon the phonetic form of the data items;

allowing a user of the application program to select a given data item from the list by inputting the given data item in phonetic form;

locating the input given data item from the list using the first order;

retrieving the program format of the given data item for use by the application program; and using the program format of the given data item to identify the user, file or object identified by the given data item;

wherein the application program is a messaging system and the data items are addresses of users in the messaging system, wherein the step of storing the data items comprises storing the addresses in an address format used by the messaging system, and wherein the step of using the program format comprises identifying a given user to which a message is directed based upon the address of the user.

2. A method for providing an application program user interface for a language having symbolic and phonetic characters, the application program using data represented in a program format different than the symbolic and phonetic characters, the method comprising:

storing a plurality of data items in a list, each data item being represented in phonetic, symbolic and program format, the data items being usable by the application program to identify a particular user, file or object accessible to or addressable by the application program;

sorting the list in a first order based upon the phonetic form of the data items;

when the application program is to display a given data item to the user other than as a result of selection of the data item by the user, locating the given data item from the list, and displaying the given data item to the user at least in symbolic form;

wherein the application program is a messaging system and the data items are addresses of users in the messaging system, wherein the step of storing the data items comprises storing the addresses in an address format used by the messaging system, and wherein the step of using the program format comprises identifying a given user to which a message is directed based upon the address of the user.

3. A method for providing a Japanese or Chinese language user interface for a messaging system, the messaging system transferring messages among users on the system based upon addresses represented in an address format, the method comprising:

storing a plurality of addresses in an address directory, each address being represented in kana, kanji, and address format;

sorting the address directory in a first order based upon the kana form of the addresses and in a second order based upon the address format of the addresses;

when creating a new message, allowing a user of the application program to select a given address from the address directory by inputting the given address in kana form;

transferring the new message using the address format; and when a message is received by a user, displaying the address of a sender of the message at least in kanji form.

4. The method of claim 3 comprising locating the address input by a user in kana form from the address directory using the first order and retrieving the address format of the given address for use by the messaging system.

5. The method of claim 3 comprising locating the address of a sender of the message from the address directory using the second order and retrieving the kanji form of the sender's address from the address directory.

6. The method of claim 3 comprising, upon request by a user, displaying all or part of the address directory at least in kanji form arranged according to the first order.

7. The method of claim 3 wherein the step of sorting comprises maintaining an index of the address directory and sorting the index in the first and second orders.

* * * * *